US010716284B2

(12) United States Patent
Link

(10) Patent No.: US 10,716,284 B2
(45) Date of Patent: Jul. 21, 2020

(54) PET DOOR ENCLOSURE SYSTEM

(71) Applicant: Precision Pet Products, Inc., Costa Mesa, CA (US)

(72) Inventor: David Link, Costa Mesa, CA (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 1326 days.

(21) Appl. No.: 13/913,625

(22) Filed: Jun. 10, 2013

(65) Prior Publication Data

US 2014/0033611 A1 Feb. 6, 2014

Related U.S. Application Data

(62) Division of application No. 13/045,035, filed on Mar. 10, 2011.

(51) Int. Cl.
*A01K 1/00* (2006.01)
*A01K 1/03* (2006.01)
*E06B 3/34* (2006.01)

(52) U.S. Cl.
CPC ............ *A01K 1/0017* (2013.01); *A01K 1/033* (2013.01); *A01K 1/034* (2013.01); *E06B 3/34* (2013.01)

(58) Field of Classification Search
USPC ....... 119/481, 501, 482, 416, 452, 453, 459, 119/461, 474, 472, 491, 492, 494, 496, 119/498, 499; D30/108, 109, 114, 116; 49/394, 395; 292/95, 340
See application file for complete search history.

(56) References Cited

U.S. PATENT DOCUMENTS

| | | | | |
|---|---|---|---|---|
| 2,860,886 | A | * | 11/1958 | Schweitzer ............. B62B 3/144 280/33.993 |
| 2,892,562 | A | * | 6/1959 | Smithson ................. A01K 1/03 119/169 |
| 3,896,766 | A | | 7/1975 | Martin |
| 4,016,833 | A | | 4/1977 | Ray |
| 4,140,080 | A | | 2/1979 | Snader |
| 4,527,512 | A | | 7/1985 | Sugiura |
| 4,590,885 | A | | 5/1986 | Sugiura |

(Continued)

FOREIGN PATENT DOCUMENTS

GB 2238296 A * 5/1991 ............... B65D 6/18

OTHER PUBLICATIONS

Precision Pet Products Inc., Wire Crates, Exercise Pens and Accessories, Advertisement, published at least as early 2007, 2 pages from IDS.*

(Continued)

*Primary Examiner* — Andrea M Valenti
(74) *Attorney, Agent, or Firm* — Global IP Counselors, LLP

(57) ABSTRACT

The door system disclosed herein includes a frame and a door fabricated from a plurality of horizontal and vertical wire rods. The door may have an inverted hook which is aligned to a horizontal wire rod of the frame when the door is pivoted to the closed position. To close the door, the door is dropped so that the horizontal wire rod of the frame is traversed into the inverted hook. At this point, the animal inside of the pet crate cannot open the door by pushing on the door. Rather, the door must be raised so that the inverted hook clears the horizontal wire rod of the frame to pivot the door to the opened position.

8 Claims, 13 Drawing Sheets

(56) References Cited

U.S. PATENT DOCUMENTS

| | | | |
|---|---|---|---|
| 4,762,085 A | 8/1988 | Ondrasik | |
| 4,763,606 A | 8/1988 | Ondrasik | |
| 4,917,047 A | 4/1990 | Wazeter, III | |
| 5,097,796 A | 3/1992 | Reimers | |
| 5,233,939 A | 8/1993 | Randolph | |
| 5,335,618 A | 8/1994 | Zarola | |
| 5,373,810 A * | 12/1994 | Martin | A01K 31/10 119/459 |
| 5,482,005 A | 1/1996 | Thom | |
| 5,544,619 A | 8/1996 | Braun | |
| 5,549,073 A * | 8/1996 | Askins | A01K 1/032 119/461 |
| 5,626,098 A | 5/1997 | Askins et al. | |
| 5,653,194 A | 8/1997 | Guy | |
| D384,443 S | 9/1997 | Offert | |
| 5,752,470 A | 5/1998 | Koneke | |
| 5,943,982 A | 8/1999 | Askins et al. | |
| 5,950,568 A | 9/1999 | Axelrod et al. | |
| 5,967,089 A | 10/1999 | Allen | |
| 6,092,488 A | 7/2000 | Allawas | |
| 6,152,081 A | 11/2000 | Baker | |
| 6,155,206 A | 12/2000 | Godshaw | |
| 6,192,834 B1 | 2/2001 | Kolozsvari | |
| 6,631,590 B1 | 10/2003 | Glowaski | |
| 6,681,720 B1 * | 1/2004 | Skurdalsvold | A01K 1/03 119/461 |
| 6,883,463 B2 * | 4/2005 | Link | A01K 1/0245 119/453 |
| 7,918,188 B1 * | 4/2011 | Harper | A01K 1/0245 119/481 |
| 2011/0180011 A1 * | 7/2011 | Chiu | A01K 31/08 119/452 |
| 2012/0227328 A1 | 9/2012 | Link | |

OTHER PUBLICATIONS

Precision Pet Products Inc., Wire Crates, Exercise Pens and Accessories, Advertisement, published at least as early 2007, from IDS filed Jun. 17, 2016.*

Midwest Homes for Pets;Championship Collection; published at least as early as 1992.

Midwest Homes for Pets; product description sheet; published at least as early as 1995.

Doskocil; The First and Only Large Collapsible Plastic Crates; published at least as early as 1995.

GoGo Pet Products Double Door Black Epoxy Folding Wire Crate, 24-Inch http://www.amazon.com/dp/B000J3YE0U/ref=twister_B00B4QL13E?_encoding+UTF8&psc=1; on sale at least by Dec. 19, 2006.

Precision Pet Products, "Suitcase Crate", photo.

Photograph of pet enclosure with doors opened, Mar. 11, 2004 (Photograph 1 of 6).

Photograph of pet enclosure with doors closed, Mar. 11, 2004 (Photograph 2 of 6).

Photograph of pet enclosure with door closed, Jan. 12, 2006 (Photograph 3 of 6).

Photograph of pet enclosure with door opened, published at least as early as 2007 (Photograph 4 of 6).

Photograph of pet enclosure with door opened, published at least as early as Apr. 13, 2007(Photograph 5 of 6).

Photograph of pet enclosure with door closed, published at least as early as Apr. 13, 2007 (Photograph 6 of 6).

Precision Pet Products Inc., Wire Crates, Exercise Pens and Accessories, Advertisement, published at least as early as 2007.

* cited by examiner

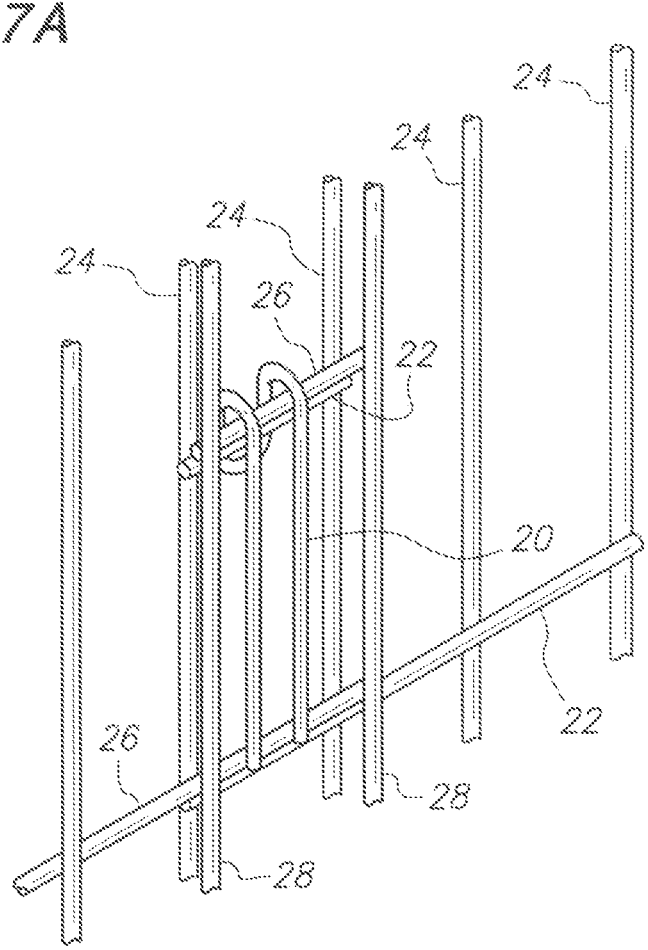

PET DOOR ENCLOSURE SYSTEM

CROSS-REFERENCE TO RELATED APPLICATIONS

The present application is a divisional patent application of U.S. patent application Ser. No. 13/045,035 entitled IMPROVED PET DOOR ENCLOSURE SYSTEM, filed on Mar. 10, 2011, the entire contents of which are incorporated herein by reference.

STATEMENT RE: FEDERALLY SPONSORED RESEARCH/DEVELOPMENT

Not Applicable

BACKGROUND

The embodiments disclosed herein relate to a pet door enclosure system.

Pet crates may be fabricated from a plurality of wire rods. Pet crates typically have six sides wherein top, front, back, left and right panels each have a plurality of vertical and horizontal transverse wire rods that are attached to each other. The bottom panel may also be fabricated from a plurality of transverse wire rods. A plastic or metal pan, mat or cushion may be placed on top of the bottom panel to allow the pet to comfortably sit in the pet crate. In one or more of the front, back, left or right panels, a door may be provided so that the pet can enter or exit the pet crate as desired. The door pivots about one of the vertical wire rods of the panel. To close the door, the user must pivot the door to the closed position and lock the door by way of a latch. The latch may be located on the opposite side of the pivot axis of the door or at multiple positions around the door. To lock the door, the user holds the door closed and engages the latch so that the door cannot be opened by the animal in the pet crate. To open the door the user unlocks the latch and opens the door. Unfortunately, for certain pet crates, the pet door may not be sufficiently strong for certain applications since the door is in most instances attached to a frame of the pet crate only at the pivot axis of the pet door and the latch. The upper and lower corners of the door may not be secured to the frame and could be permanently deformed when the animal pushes on the door.

Accordingly, there is a need in the art for an improved pet door enclosure system.

BRIEF SUMMARY

The door system discussed herein addresses the needs discussed above, discussed below and those that are known in the art.

The door system disclosed herein will be described in relation to a pet crate. However, the door system disclosed herein may be implemented in an animal crate for a wild animal as well as different uses. By way of example and not limitation, the door system may also be incorporated into products other than a pet crate such as a hallway gate, partition, a back door pet entry way as well as to other products and situations. However, the door system discussed herein will be discussed in relation to a pet crate for the purposes of clarity and convenience, but may be implemented in the aforementioned products and situations.

The door system may be incorporated into a pet crate. The door system may have a frame and a door. The door and frame may both be fabricated from a plurality of vertical and horizontal wire rods. The frame of the door system forms an aperture through which a pet enters and exits the pet crate. The door is attached to the frame so that the door can be pivoted to the closed position. In the closed position, the pet cannot pass through the aperture of the frame. The door can also be pivoted to the opened position so that the pet can pass through the aperture of the frame. The door may have a plurality of inverted hooks that may receive one or more of the horizontal wire rods of the frame. The inverted hooks are positioned on the door so that the door must be raised for the inverted hooks to clear the horizontal wire rod of the frame when opening or closing the door. To close the door when the door is open, the door is raised and pivoted so that the door is flush against the frame. In this position, the inverted hooks are equipped to receive the horizontal wire rods of the frame when the door is lowered. When the door is lowered, the door is now in the closed position. To lock the door, a latch is engaged to secure the door in the closed position. Beneficially, the inverted hooks may be placed at strategic locations around a periphery of the door to strengthen the door.

To open the door when the door is closed, the latch is first disengaged. Although one latch per door is shown, it is also contemplated that the door may have multiple latches positioned around the door. The door is then raised, at which time the inverted hooks can clear the horizontal wire rods of the frame. The door is now pivoted to the opened position. Accordingly, the improved door system allows convenient closure and opening of the door and also strengthens the door so that the door can withstand greater abuse by strong animals. The door can also remain closed without having to engage the latch.

More particularly, an animal door system is disclosed which comprises a frame and a door. The frame may have a plurality of interconnected vertical and horizontal wire rods with an opening at a central area of the frame for allowing an animal to pass therethrough. The door may have a plurality of interconnected vertical and horizontal wire rods. The door may be pivotally attached to a first vertical wire rod of the frame for pivoting the door between opened and closed positions. The door may have a first inverted hook which receives a first horizontal wire rod of the frame when the door is in the closed position to strengthen the animal door system.

The first and second horizontal wire rods of the door may be wrapped around the first vertical wire rod of the frame for pivotally attaching the door to the frame.

One or more hooks may be utilized. By way of example and not limitation, the first inverted hook may be located at the upper portion of the door. Also, the door may further comprise a second inverted hook attached to a lower portion of the door. Moreover, a third inverted hook may be attached between the first inverted hook and the pivot connection between the door and the frame at the upper portion of the door.

The door system may further comprise a latch attached to an opposite side of the door from the pivot axis of the door.

An opening of the inverted hook may point downward. A width of the opening of the inverted hook attached to the door may be greater than a diameter of the horizontal wire rod of the frame.

Additionally, an animal door system is disclosed which may comprise a door and a frame. The door may have a plurality of interconnected vertical and horizontal wire rods. The frame may have a plurality of interconnected vertical and horizontal wire rods containing a large opening at a central area of the frame for allowing an animal to pass threrethrough. The frame may have a first upright hook wherein the door is pivotally attached to a first vertical wire rod of the frame for pivotally opening and closing the door. The first upright hook receives a first horizontal wire rod of the door when the door is in the closed position to strengthen the animal door system.

An opening of the upright hook may point upward for receiving a wire rod of the door being lowered. A width of the opening of the upright hook attached to the frame may be greater than a diameter of the horizontal wire rod of the door.

Additionally, a method of opening and closing a door is disclosed which comprises the steps of: with the door closed, raising the door to clear a hook attached either to the door or the frame from a first horizontal wire rod of a frame or the door; pivoting the door to the opened position; and lowering the door.

The method may further comprise the steps of: with the door opened, raising the door to clear a hook attached either to the door or the frame from a first horizontal wire rod of the frame or the door; pivoting the door to the closed position; and lowering the door so that the hook attached either to the door or the frame receives the first horizontal wire rod of the frame or the door.

The hook may be an inverted hook attached to the door and raising the door clears the inverted hook attached to the door from the first horizontal wire rod of the frame. Alternatively, the hook may be an upright hook attached to the frame and raising the door clears the upright hook attached to the frame from the first horizontal wire rod of the door.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7A is an enlarged view of one of the inverted hooks shown in FIG. 7;

DETAILED DESCRIPTION

Figure 1:
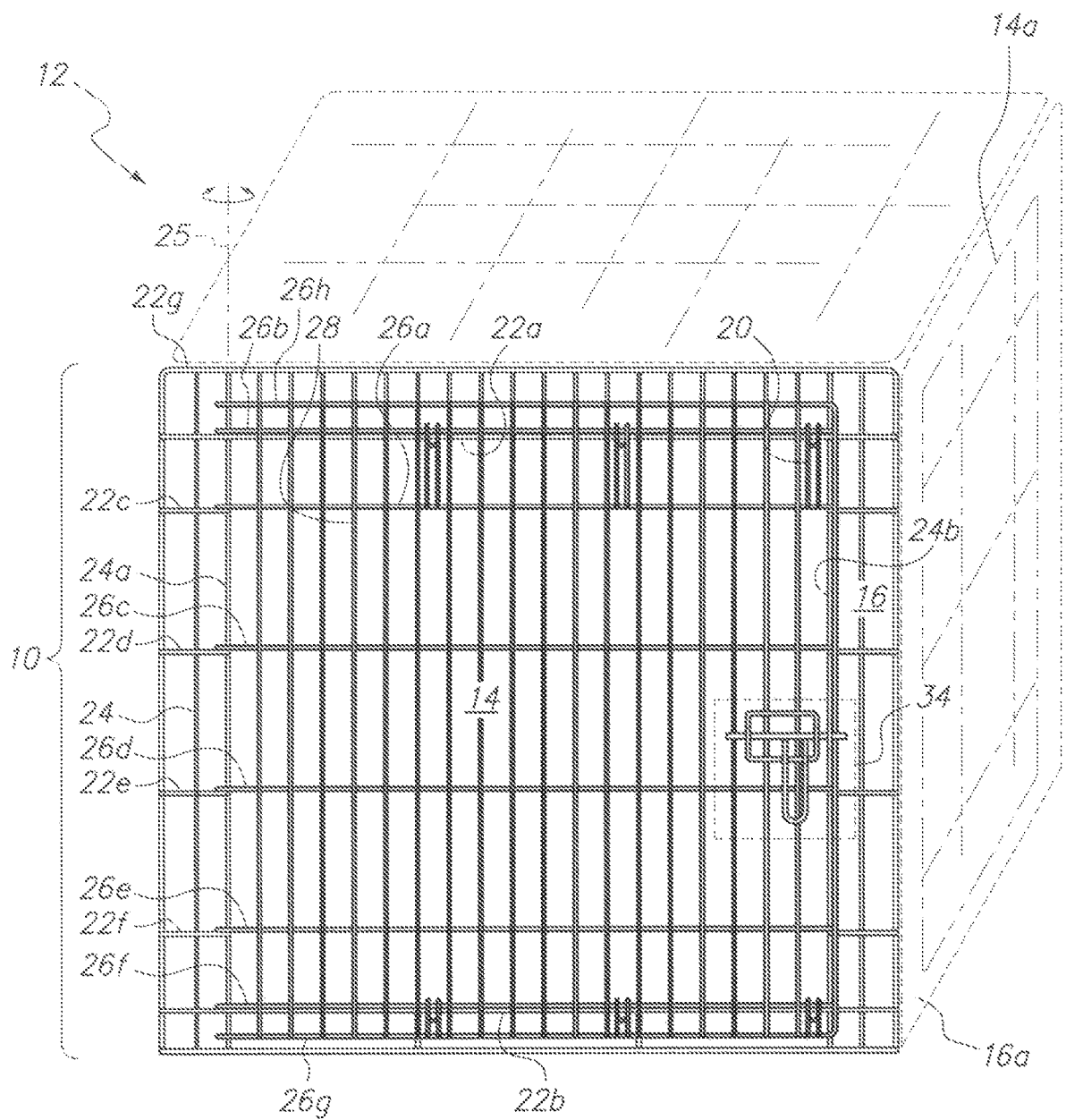
FIG. 1 is an illustration of a pet crate incorporating an improved pet door enclosure system.
Figure 3:
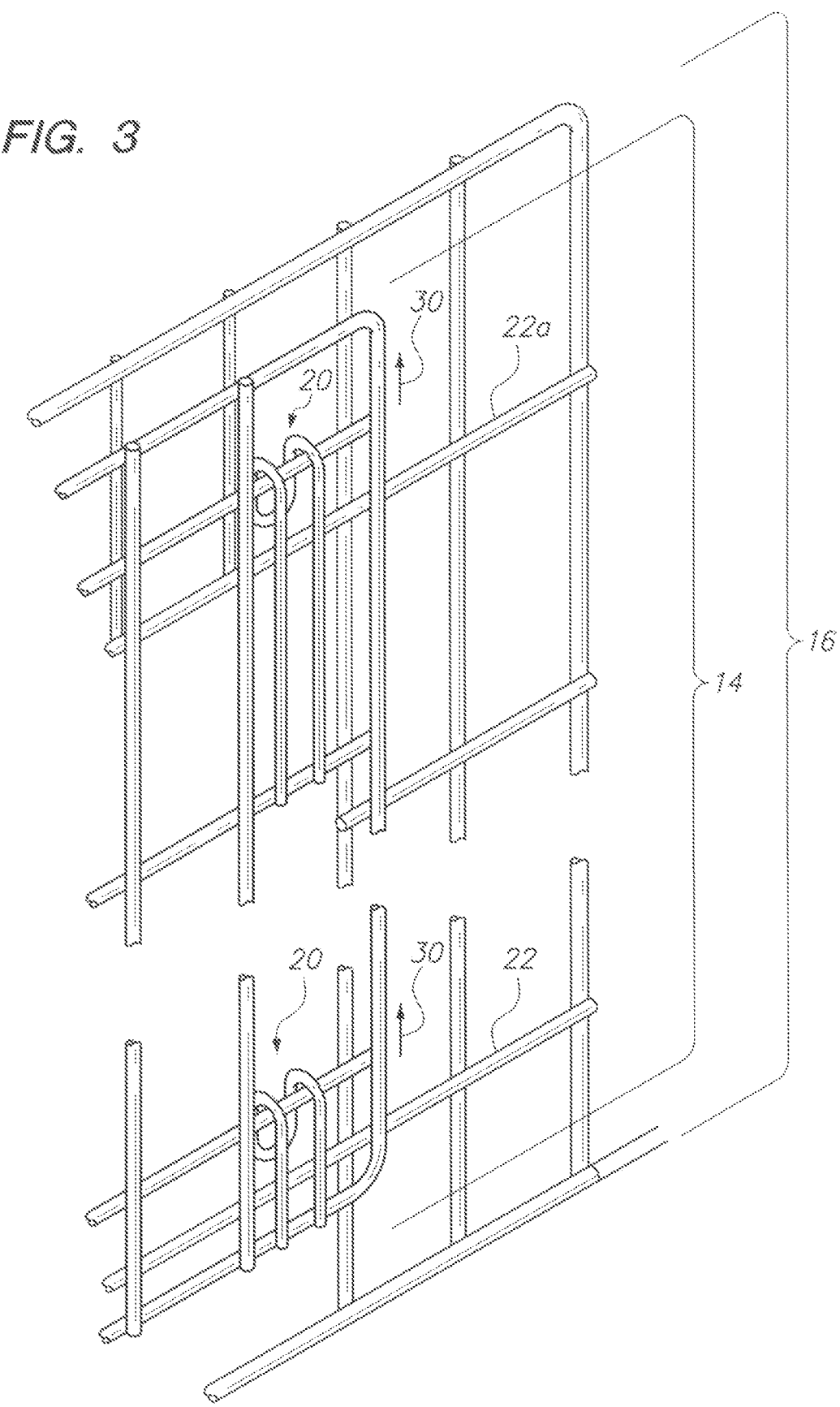
FIG. 3 is an illustration of a door and frame shown in FIG. 2 with the door in a raised position.
Figure 4:
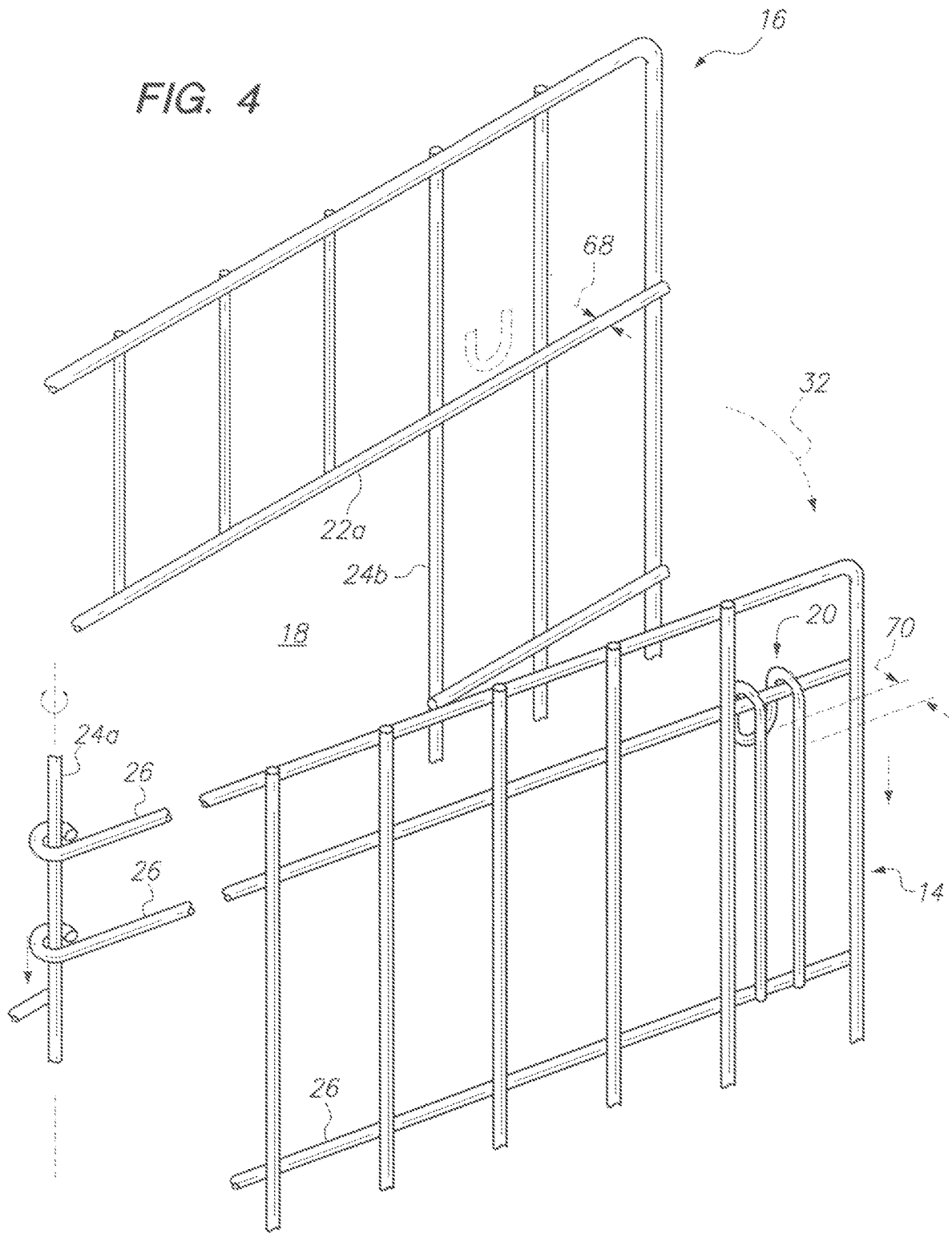
FIG. 4 is an illustration of a door and frame shown in FIG. 3 with the door pivoted to an opened position.

Referring now to the drawings an improved door system 10 is shown. The door system 10 is shown in FIG. 1 as being incorporated into a pet crate 12. However, the door system 10 can be incorporated into other products such as a hallway gate, etc. The door system 10 discussed herein automatically aligns hooks 20, 48 and tabs 50, 64 to rods 22, 26 when the door 14 is pushed flush against the frame 16 to block, cover or close an aperture 18 of the frame 16. The aperture 18 allows an animal or pet to enter or exit the pet crate 12. By way of example and not limitation, the door 14 may have one or more inverted hooks 20 that can be placed at strategic locations around the door to strengthen the door 14. The inverted hooks 20 are removably securable to horizontal wire rods 22 of the frame 16. To open the door 14 from the closed position, the door 14 is raised so that the inverted hooks 20 clear the horizontal wire rods 22 as shown in FIG. 3. After the inverted hooks 20 clear the horizontal wire rods 22, the door 14 may be pivoted as shown in FIG. 4 to provide access through the aperture 18 of the frame 16. To close the door 14 from the opened position, the user raises the door 14 so that the inverted hooks 20 clear the horizontal wire rods 22. The door 14 is pivoted until the door 14 contacts the frame 16. At this time, the inverted hooks 20 are automatically aligned to the horizontal wire rods 22 whenever the door 14 contacts the frame 16. When the user releases the door 14, the door 14 slides down and the inverted hooks 20 engage the horizontal wire rods 22. The door 14 is now closed. When the animal or pet pushes against the door 14, the door 14 remains closed, because the rods 22 are received into the inverted hooks 20. By way of example and not limitation, the inverted hooks 20 are strategically positioned around the periphery of the door 14 so as to strengthen the door 14 and mitigate bending or breakage of the door 14. The inverted hooks 20 may be placed at the upper and lower corners of the door 14 to reinforce the frame 16. Moreover, the inverted hooks 20 do not protrude out so as to create a hazard for the animal entering and exiting the aperture as well as the operator of the door system 10.

Figure 8A:
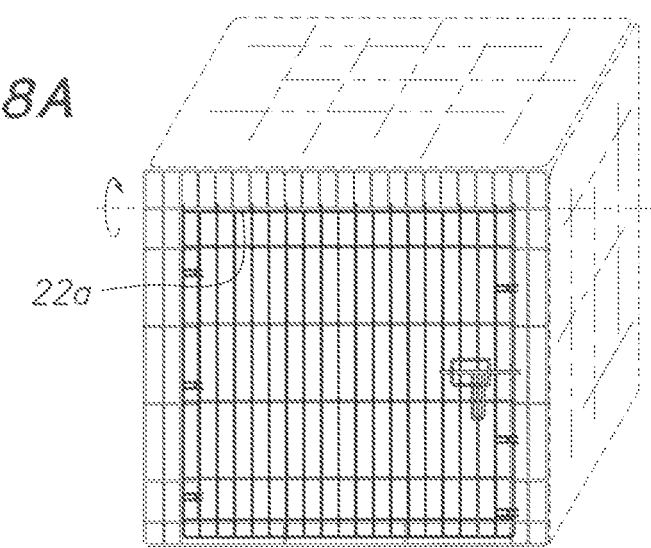
FIG. 8A is an illustration of the improved pet door enclosure system shown in FIG. 1 with the door pivotable upward on an upper edge of the door.
Figure 8B:
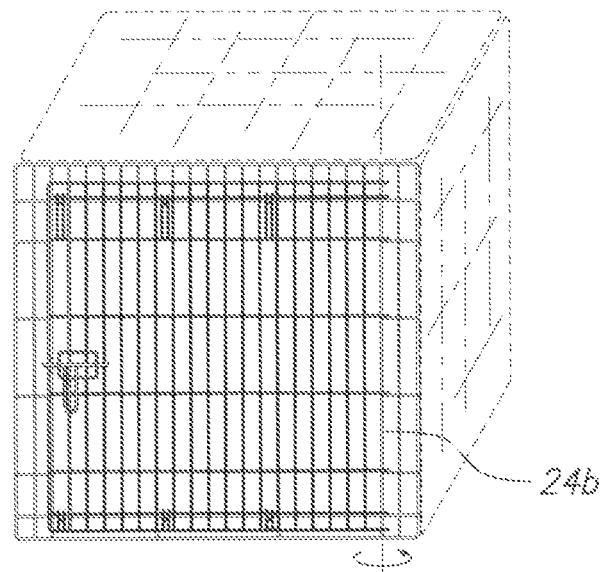
FIG. 8B is an illustration of the improved pet door enclosure system with the door pivotal on a right edge of the door.
Figure 8C:
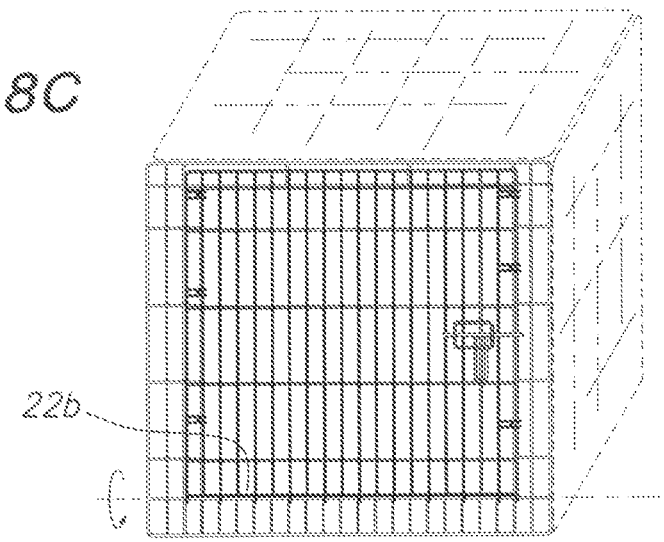
FIG. 8C is an illustration of the improved pet door enclosure system with a door pivotal about the lower edge of the door.

More particularly, the frame 16 may be fabricated from a plurality of horizontal and vertical wire rods 22, 24. The frame 16 defines the aperture 18 (see FIG. 4) by vertical wire rods 24a, b (see FIG. 1) and horizontal wire rods 22a, b (see FIG. 1). The vertical and horizontal wire rods 24a, b, 22a, b define an inner periphery of the frame aperture or opening 18. The door 14 is also comprised of a plurality of horizontal and vertical wire rods 26, 28. The vertical and horizontal wire rods 26g, h and 28b define an outer periphery of the door 14. The door 14 is pivotally attached to one of the vertical wire rods 24 of the frame 16. In particular, the door 14 may be pivotally attached to the inner most left vertical wire rod 24a (see FIGS. 1 and 4). Referring to FIG. 4, the horizontal wire rods 26 of the door 14 are wrapped around the vertical wire rod 24a of the frame 16 so that the door 14 pivots around vertical wire rod 24a. The vertical wire rod 24a defines a pivot axis 25 of the door 14. The door 14 may be designed to pivot about any of the vertical or horizontal wire rods 22, 24 of the frame 16 as shown in FIGS. 8A-8C, and discussed below. For purposes of clarity, the door system 10 is discussed in relation to a door 14 that opens to the left as shown in the figures.

The door 14 may be traversed up and down (see FIGS. 2 and 3) so that the inverted hooks 20 of the door 14 may clear horizontal wire rods 22 of the frame 16 to open and close the door 14. The door 14 can be vertically traversed to the extent that the horizontal wire rods 26 of the door 14 wrapped around the vertical wire rods 24 slide between the horizontal wire rods 22 of the frame 16. The distance between adjacent horizontal wire rods 22, 26 may be adjusted so that the door 14 may be sufficiently raised for the inverted hooks 20 to clear the horizontal rods 22. For the embodiment shown in the figures, when the door 14 is released, the horizontal wire rods 26a-f wrapped about the vertical wire rod 24a contact and rest upon the horizontal wire rods 22a-f. When the user raises the door 14, the upper most and lower most horizontal wire rods 26g, h of the door 14 contact the horizontal wire rods 22g, b to prevent or limit the vertical traversal of the door 14. Other configurations are also contemplated to regulate the range of vertical traversal of the door 14. The range of vertical movement for the door 14 may be enlarged so as to be sufficient for the inverted hooks 20 to clear the horizontal wire rods 22 when opening and closing the door 14.

Figure 2:
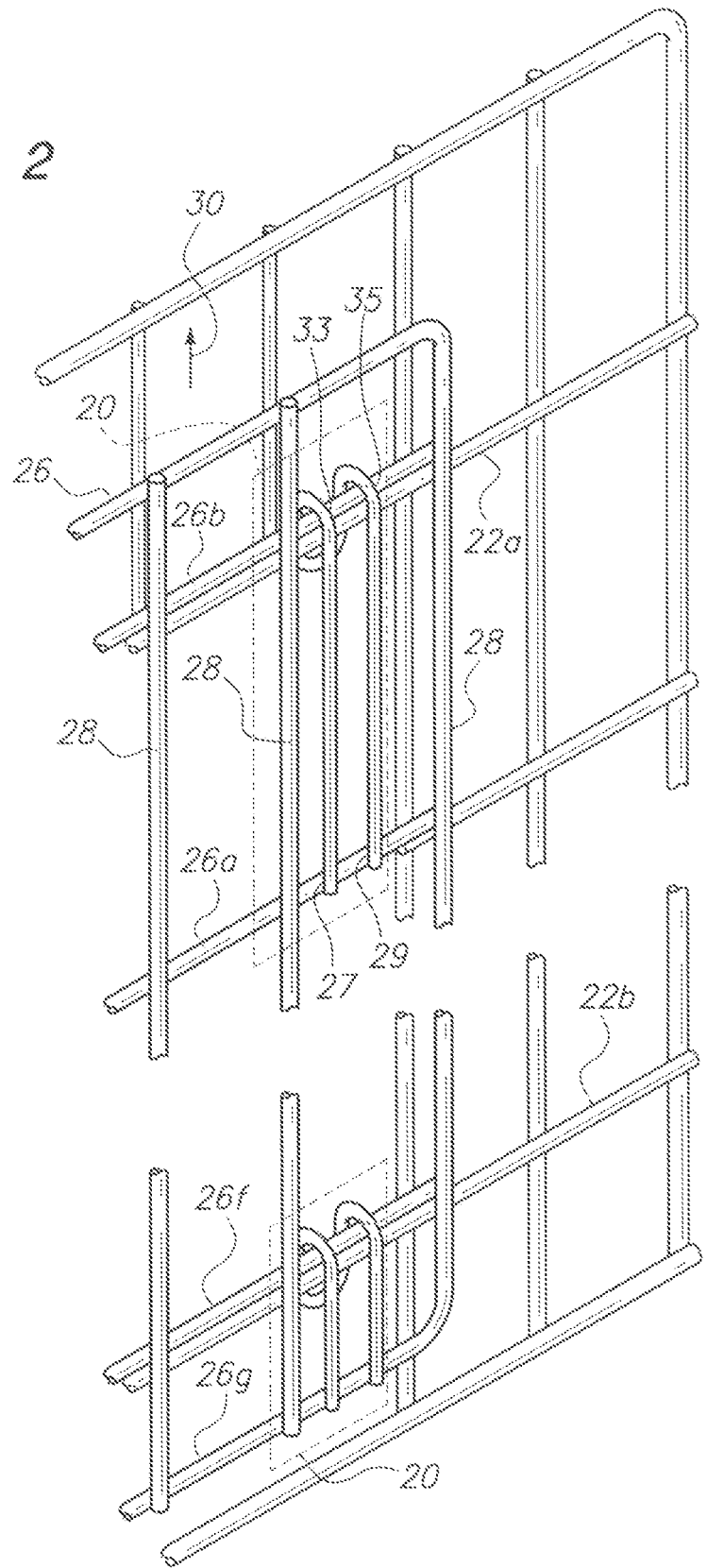
FIG. 2 is a perspective view of inverted hooks that engage horizontal rods of a frame at upper and lower corners of a door of the pet door enclosure system shown in FIG. 1 wherein the door is in a closed position.
Figure 7:
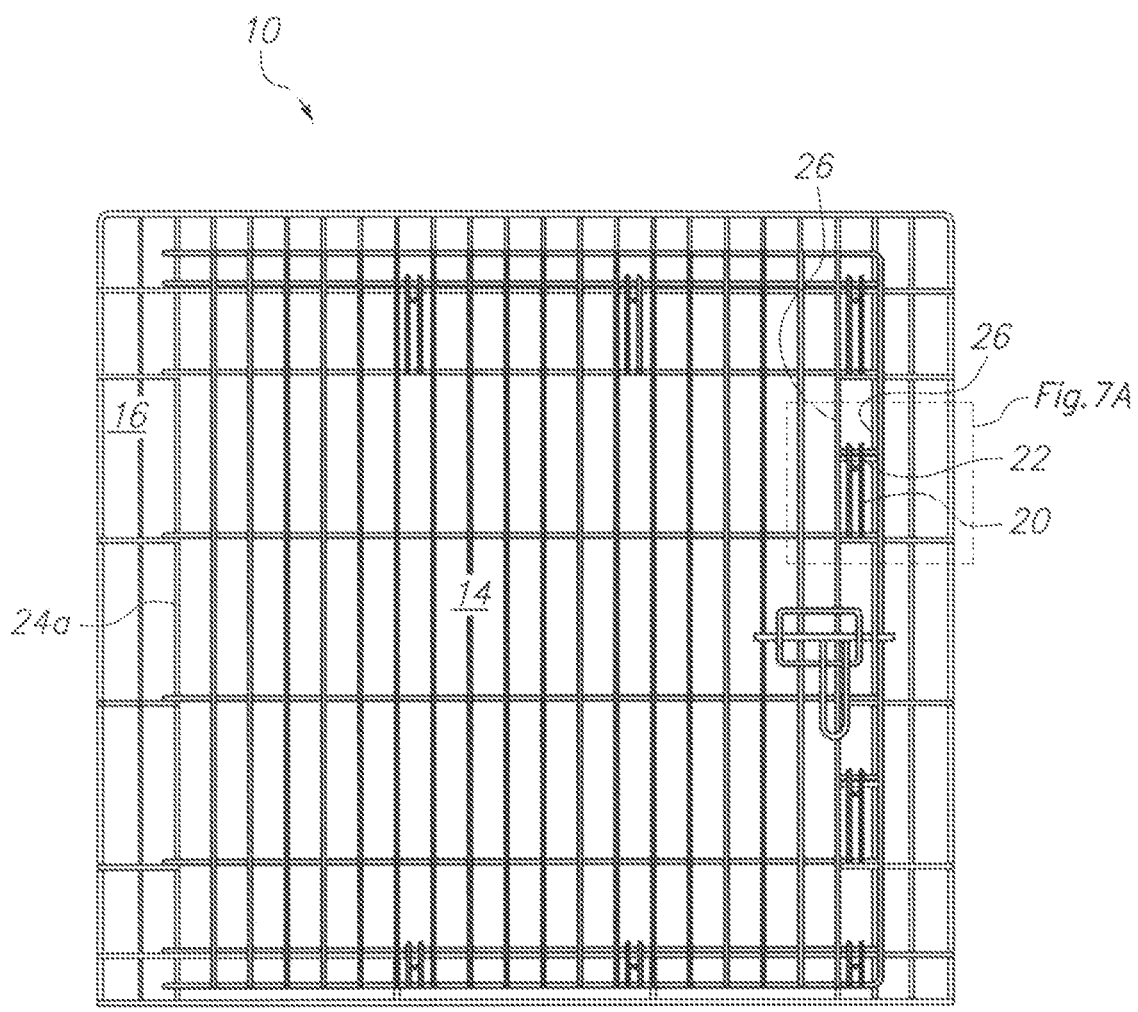
FIG. 7 is an alternate embodiment of the improved pet door enclosure system shown in FIG. 1 with inverted hooks of the door positioned along a right vertical edge of the door opposite a pivot side of the door wherein the inverted hooks engage the frame.

Referring now to FIG. 2, an enlarged view of inverted hooks 20 at upper and lower corners of the door 14 which are engaged to horizontal wire rods 22a, b of the frame 16 are shown. The door 14 is made up of a plurality of horizontal and vertical wire rods 26, 28. The inverted hooks 20 may also be fabricated from a wire rod and shaped into a hook configuration. The inverted hooks 20 may be attached (e.g. welded) to the horizontal wire rod 26a at point 27. The wire rod of the inverted hook 20 extends upward, backward and back down to the horizontal wire rod 26a and is connected at point 29 to the horizontal wire rod 26a. The wire rod of the inverted hook 20 may have an inverted U-shape configuration Optionally, it is contemplated that a second horizontal wire rod 26b of the door 14 may be attached to the inside of the inverted hooks 20 to add rigidity to the inverted hook 20 at points 33 and 35. An inverted hook 20 may also be positioned at the lower corner of the door 14. The inverted hook 20 may be attached to the horizontal wire rods 26f, g in a similar manner as discussed above. The horizontal wire rods 26a-h, extend across the entire width of the door 14. The inverted hooks 20 may be attached at other locations on the door 14, as shown in FIG. 1. These inverted hooks 20, when the door 14 is in the closed position, add further rigidity to the door 14 so that pushing or pulling does not cause the door 14 to permanently deform inward or outward along the upper and lower edges of the door 14. The pushing and pulling forces are distributed to the frame 16 through the inverted hooks 20. The inverted hooks 20 engage the horizontal wire rods 22 of frame 16 so that energy imparted to the door 14 is also distributed to the frame 16. Additional inverted hooks 20 can be placed along the right vertical edge of the door 14 by overlapping the door 14 with the frame 16 as shown in FIGS. 7 and 7A, as discussed herein. These inverted hooks 20 may be positioned inside of an outer periphery of the door 14. The inverted hooks 20 do not protrude out of the outer periphery of the door so that the inverted hooks 20 do not injure an animal or user/operator.

To open the door 14 from the closed position, the user raises the door 14 vertically in the direction of the arrow 30 (see FIG. 2). The door 14 is raised until the hooks 20 clear the horizontal wire rods 22 of the frame 16 as shown in FIG. 3. The door 14 can be raised until the horizontal wire rods 26 of the door 14 contact the horizontal wire rods 22 of the frame 16. In the raised position, which is shown in FIG. 3, the hooks 20 clear the horizontal wire rods 22 of the frame 16. After raising the door 14, the user rotates the door 14 in the direction of arrow 32, as shown in FIG. 4. The user can then lower the door 14. The door 14 stops when the horizontal wire rod 26 of the door 14 contacts the horizontal wire rods 22 of the frame 16. The user can then fully pivot the door 14 to the opened position.

To close the door 14, the user raises the door 14 so that the hooks 20 clear the horizontal wire rods 22 of the frame 16. The door 14 can be raised until the horizontal rods 26 of the door 14 contact the horizontal rods 22 of the frame 16. In the example shown in FIG. 1, the door 14 is raised until horizontal rods 26g, h contact horizontal rods 22b, g. After raising the door 14, the user then pivots the door 14 so that the door 14 is now flush with the frame 16. In this position, the inverted hooks 20 are automatically aligned to the horizontal wire rods 22 of the frame 16. The user does not adjust the position of the door 14 to align the inverted hooks 20 to the wire rods 22. Rather, the user merely places the door 14 flush against the frame 16 to automatically align the inverted hooks 20 to the wire rods 22. Once the door 14 is flush with the frame 16, the user lowers the door 14. Because the opening of the inverted hooks 20 may be fabricated so as to be wider than a diameter of the wire rods 22, the inverted hooks 20 receive the horizontal wire rods 22 of the frame 16. In particular, a diameter 68 (see FIG. 4) of the horizontal rod 22 may be less than a width 70 (see FIG. 4) of an opening of the inverted hook 20. Once the door 14 is flush with the frame 16, the user can release the door 14 to allow the door 14 to drop and the inverted hooks 20 to automatically engage the horizontal wire rods 22.

Figure 5:
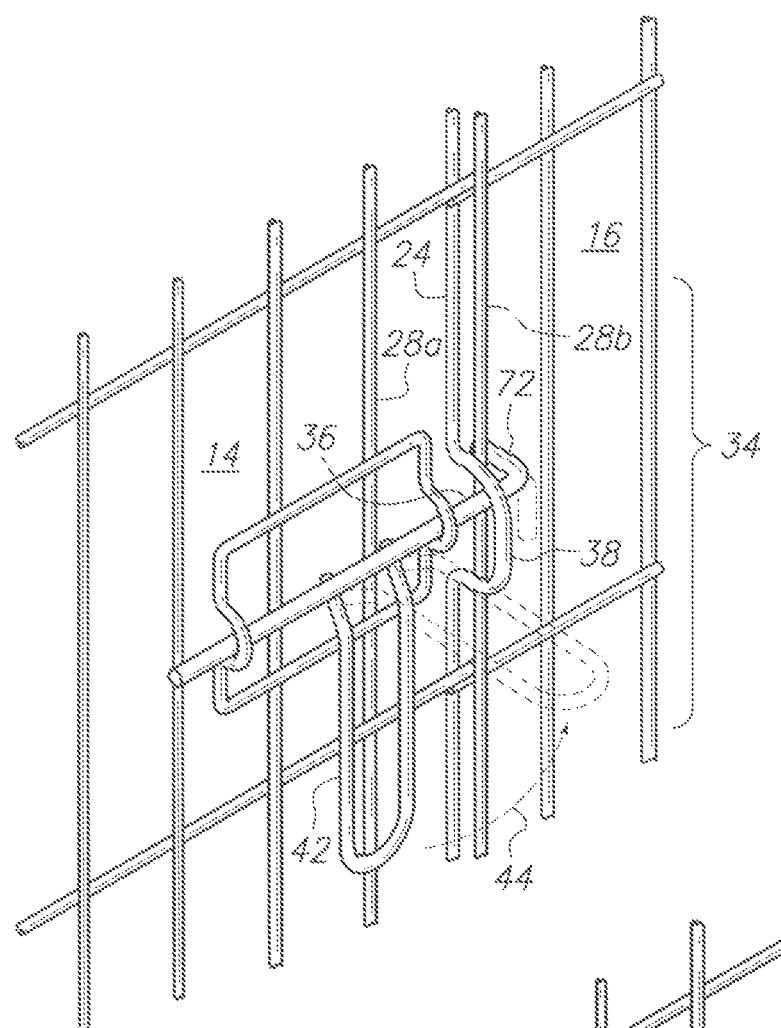
FIG. 5 is an illustration of a latch for locking the door shown in FIG. 1 in the closed position.
Figure 6:
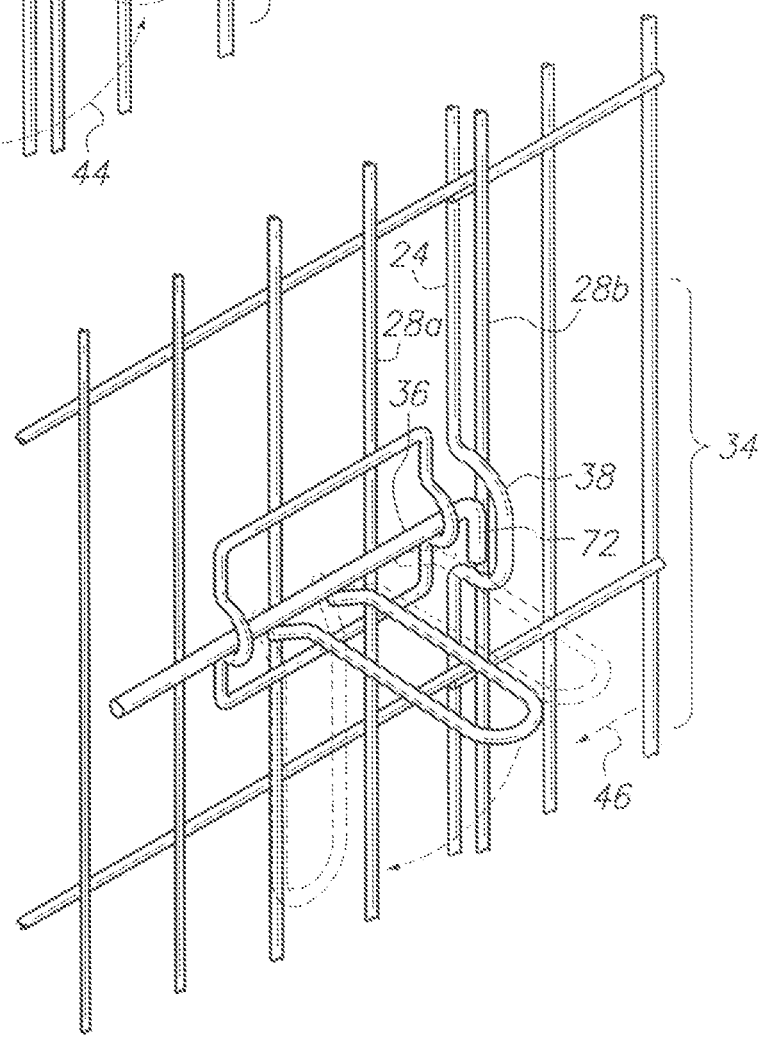
FIG. 6 is an illustration of the latch shown in FIG. 5 wherein the latch is in the unlocked position.

Referring now to FIGS. 1, 5 and 6, the door system 10 may also include one or more optional latches 34. The latch 34 prevents the user or the animal from traversing the door 14 up in order to inadvertently open the door. When the latch 34 is engaged (see FIG. 5), the door 14 cannot be opened. When the user or animal attempts to lift the door 14, a bolt 36 is trapped within a bolt hole 38. The bolt hole 38 may be formed by one of the vertical wire rods 24 of the frame 16. To unlock the latch 34, the bolt 36 can be traversed in the horizontal direction as shown by arrow 46. When the bolt 36 is traversed to the left as shown by arrow 46, the bolt 36 clears the bolt hole 38 and the door 14 may be raised to open the door 14. To move the bolt 36 to the left, the user must first rotate a handle 42 upward in the direction of arrow 44. The handle 42 is attached to the back side of the bolt 36 so that when the handle 42 is in the down position (see FIG. 5), the handle interferes with vertical wire rod 28a thereby limiting horizontal traversal of a bolt 36. The bolt 36 cannot come out of the bolt hole 38. Also, an inturned portion 72 of the bolt 32 interferes with the vertical wire rod 28b (see FIG. 4) of the door 14. When the handle 42 is raised as shown in dash lines in FIG. 5, the handle 42 clears the vertical wire rod 28a and the inturned portion 72 of the bolt 32 clears the vertical wire rod 28b of the door 14. At this point, the user can shift the handle 42 to the left as shown by arrow 46 in FIG. 6. The bolt 36 clears the bolt hole 38. The inturned portion 72 clears the vertical wire rod 28b. The handle 42 clears the vertical wire rod 28. When the handle 42 is released, the user can raise and lower the door 14 in order to disengage the inverted hooks 20 from the horizontal wire rods 22 of the frame 16. Although the bolt 32 was described as having the inturned portion 72, it is also contemplated that the bolt 32 may be straight.

Referring now to FIGS. 7 and 7A, the inverted hooks 20 may be positioned on a right vertical side of the door 14. These inverted hooks 20 may also be positioned on an inside of the outer periphery of the door 14 for the same reasons discussed above, namely, safety to the animal and/or user/operator. The door 14 may overlap the frame 16 (see FIG. 7). A short horizontal wire rod 22 can be positioned between vertical wire rods 28 which are removably engageable to the hooks 20. Accordingly, the door 14 may be secured to the entire periphery of the aperture 18 of the frame 16. On the left side, the door 14 is pivotally wrapped around the vertical wire rod 24a. Inverted hooks 20 may engage the top, bottom and right edges of the door 14 and the inner periphery of the aperture 18 of the frame 16.

Referring now to FIGS. 8A-C, other orientations of the door 14 of the system 10 are shown. In FIG. 8A, the door 14 pivots about horizontal wire rod 22a of the frame 16. To open the door 14, the latch 38 is disengaged and the door 14 is slid over to the right. The door 14 can be pivoted upward. To close the door 14, the door is laid flush against the frame 16. The door 14 is slid over to the left. Optionally, the latch 38 can then be engaged. In FIG. 8C, the door 14 pivots about the right vertical wire rod 24b. The door 14 is opened and closed in the same manner discussed above in relation to FIGS. 1-4. In FIG. 8B, the door 14 pivots about bottom horizontal wire rod 22b. To open the door 14, the latch 38 is disengaged and the door 14 is slid over to the right. The door 14 can be pivoted downward. To close the door 14, the door is laid flush against the frame 16. The door 14 is slid over to the left. Optionally, the latch 38 can then be engaged. Although the door 14 is oriented so as to open in different orientations, the hooks 20 align to the wire rods 22 or 24 of the frame 16 when the door 14 is flush or contacts the frame 16.

Figure 9:
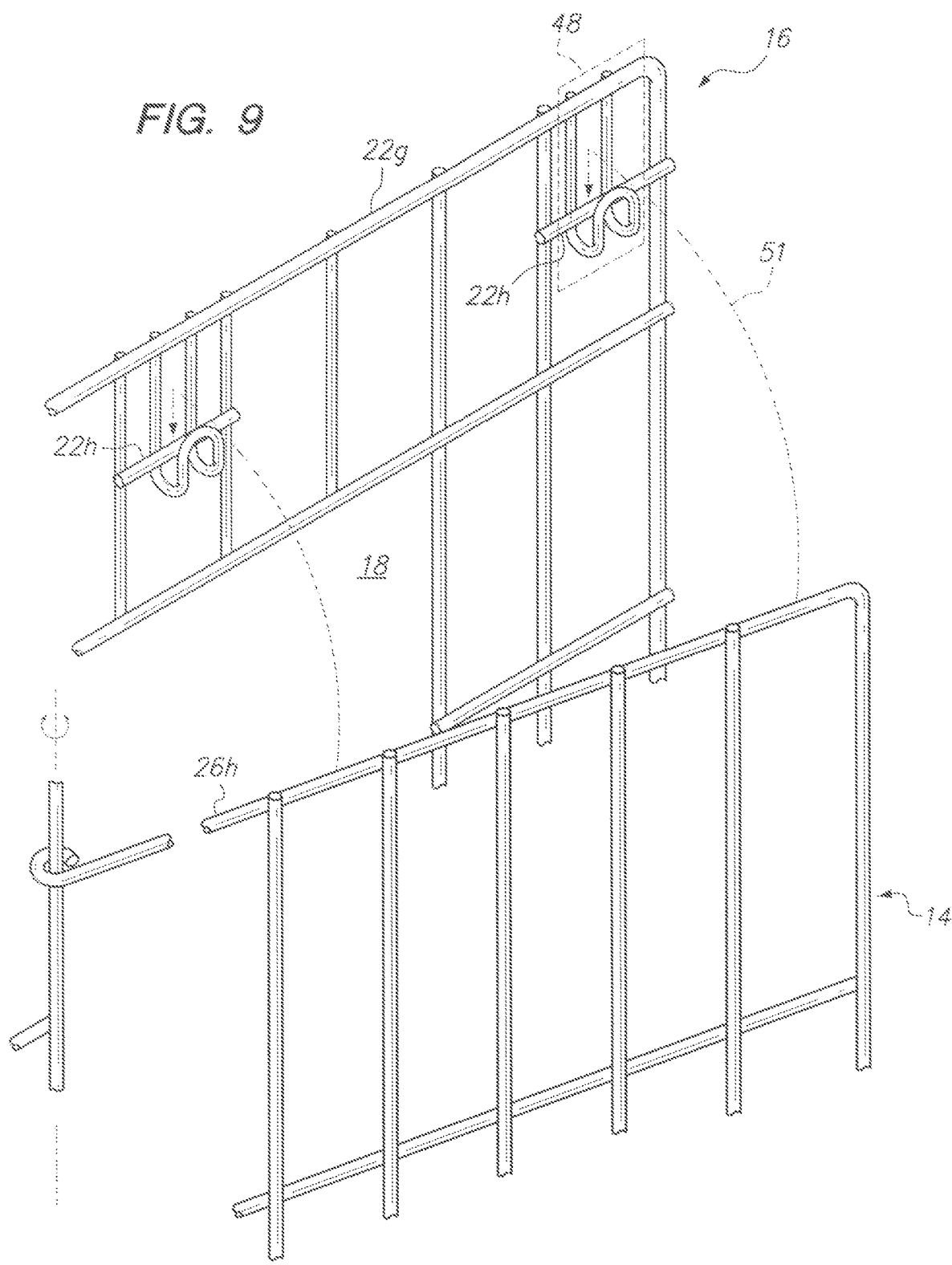
FIG. 9 illustrates an alternate embodiment of the improved pet door enclosure system wherein upright hooks are attached to the frame which is engaged to horizontal wire rods of the door.

Referring now to FIG. 9, an alternate embodiment of the door system 10 is shown. Instead of inverted hooks 20 on to the door 14, upright hooks 48 are attached to the frame 16. The upright hooks 48 may be positioned outside an inner periphery of the opening 18 so that the inverted hooks 48 do not injure the animal entering or exiting through the aperture 18 and/or the user/operator operating the door 14. The upright hooks 48 may have an opening that receives one or more horizontal wire rods 26 of the door 14 as shown by arrow 51. By way of example and not limitation, one or more of the upright hooks 48 may be positioned along the upper side, lower side and/or the right side of the frame 16. These upright hooks 48 may also be positioned outside an inner periphery of the opening 18 for the same reasons discussed above. The upright hooks 48 may be secured to the horizontal wire rod 22g of the frame 16. The door 14 may be raised and pivoted so that the wire rods 26h may be inserted into the upright hook 48 as shown by the dash line 51. To add further rigidity to the upright hook 48, optional short segmented horizontal wire rods 22h may be attached to the distal end portion of the upright hooks 48. The upright hooks 48 are shown at the upper corner of the frame 16. However, it is also contemplated that the upright hooks 48 may be disposed at the lower corner of the frame 16 and the right side of the frame 16, the upper and/or lower side of the frame. The upright hooks 48 may be disposed along the left side of the frame 16 when the door 14 pivots open to the right instead of to the left as shown and described in the figures. These upright hooks may also be positioned outside an inner periphery of the frame opening 18 for the same reasons discussed above, namely, safety. Although not shown in FIG. 9, a latch 34 (see FIGS. 5 and 6) may be secured to the door 14 and frame 16 to lock the door 14 in the closed position in the same manner as discussed above.

The improved door system 10 disclosed herein simplifies manufacture of the door 14 since the horizontal and vertical wire rods 22, 24 of the frame 16 and door 14 may be selectively positioned. Moreover, the additional inverted hooks 20 or upright hooks 48 increase the strength of the door 14 to mitigate permanent deformation of the door 14 when an animal is trying to push through the closed door 14. Forces applied to the door are distributed to the frame 16. Also, the wire rods of the door 14 and frame 16 may be fabricated from lighter or smaller wire rods since the inverted hooks 20 or the upright hooks 48 strengthens the door 14.

Figure 10:
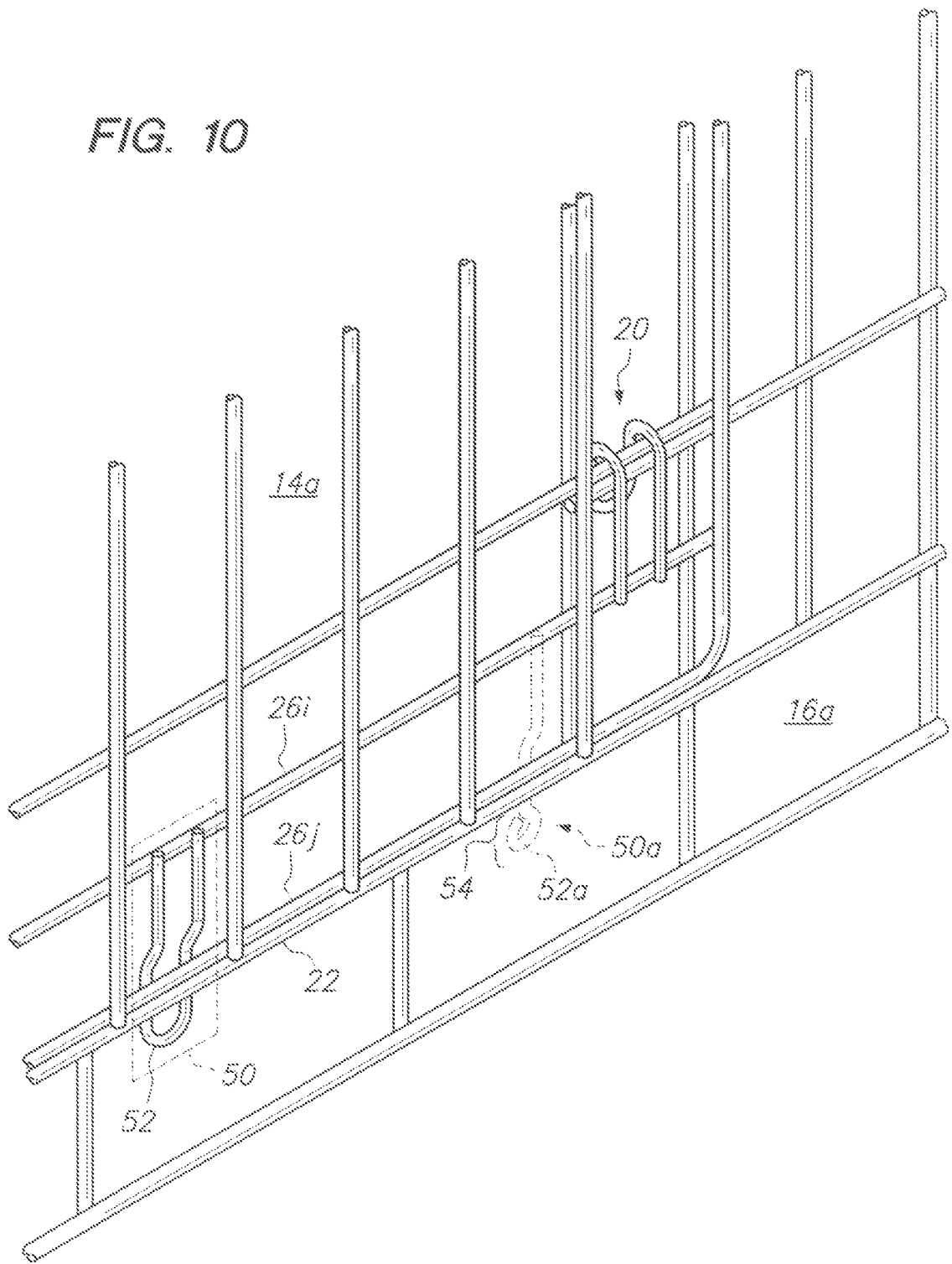
FIG. 10 is an illustration of an inverted tab with a door in the closed position.
Figure 11:
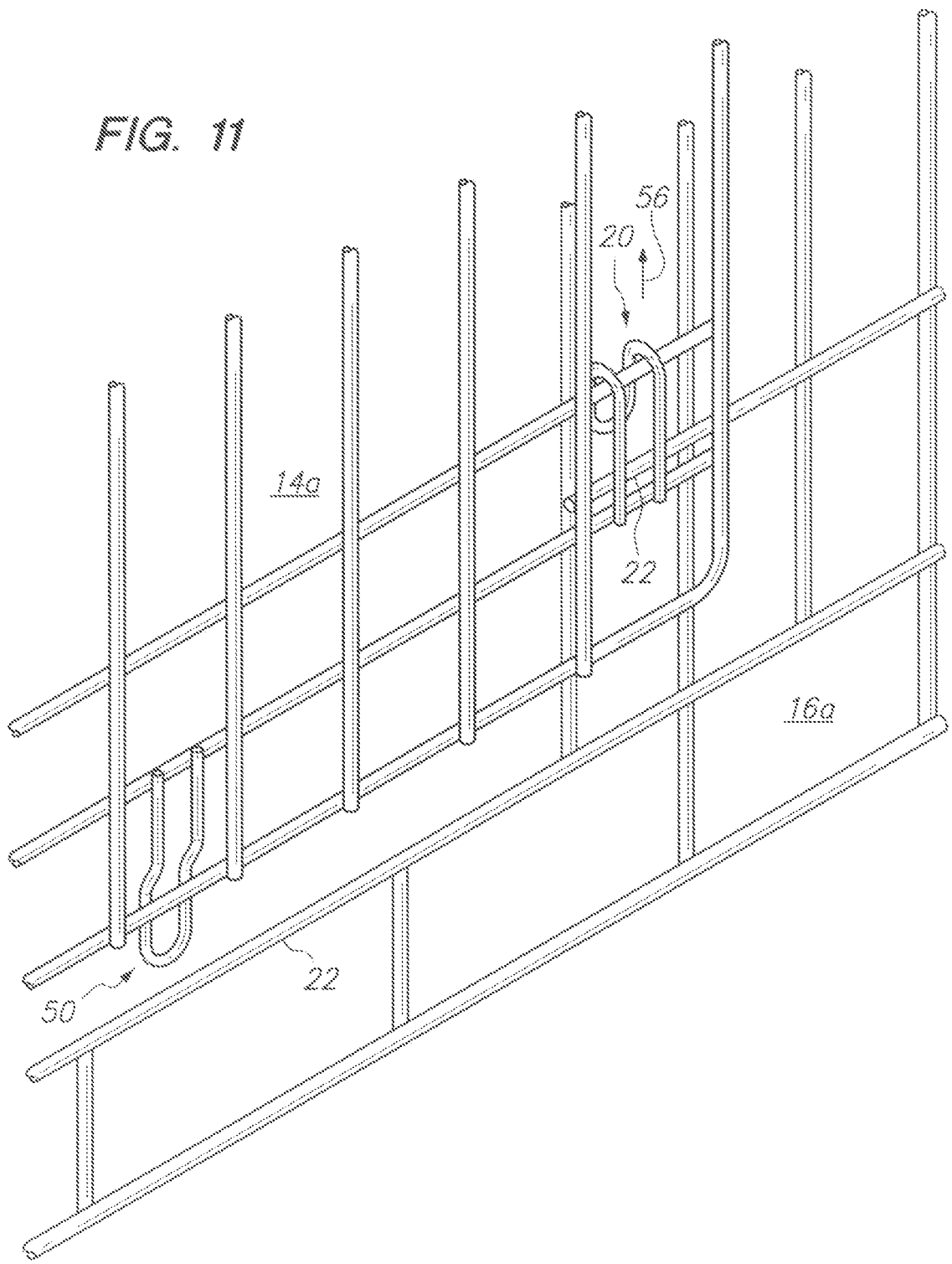
FIG. 11 is an illustration of the door and frame shown in FIG. 10 with the door in a raised position so that the inverted tab clears the horizontal wire rods of the frame.
Figure 12:
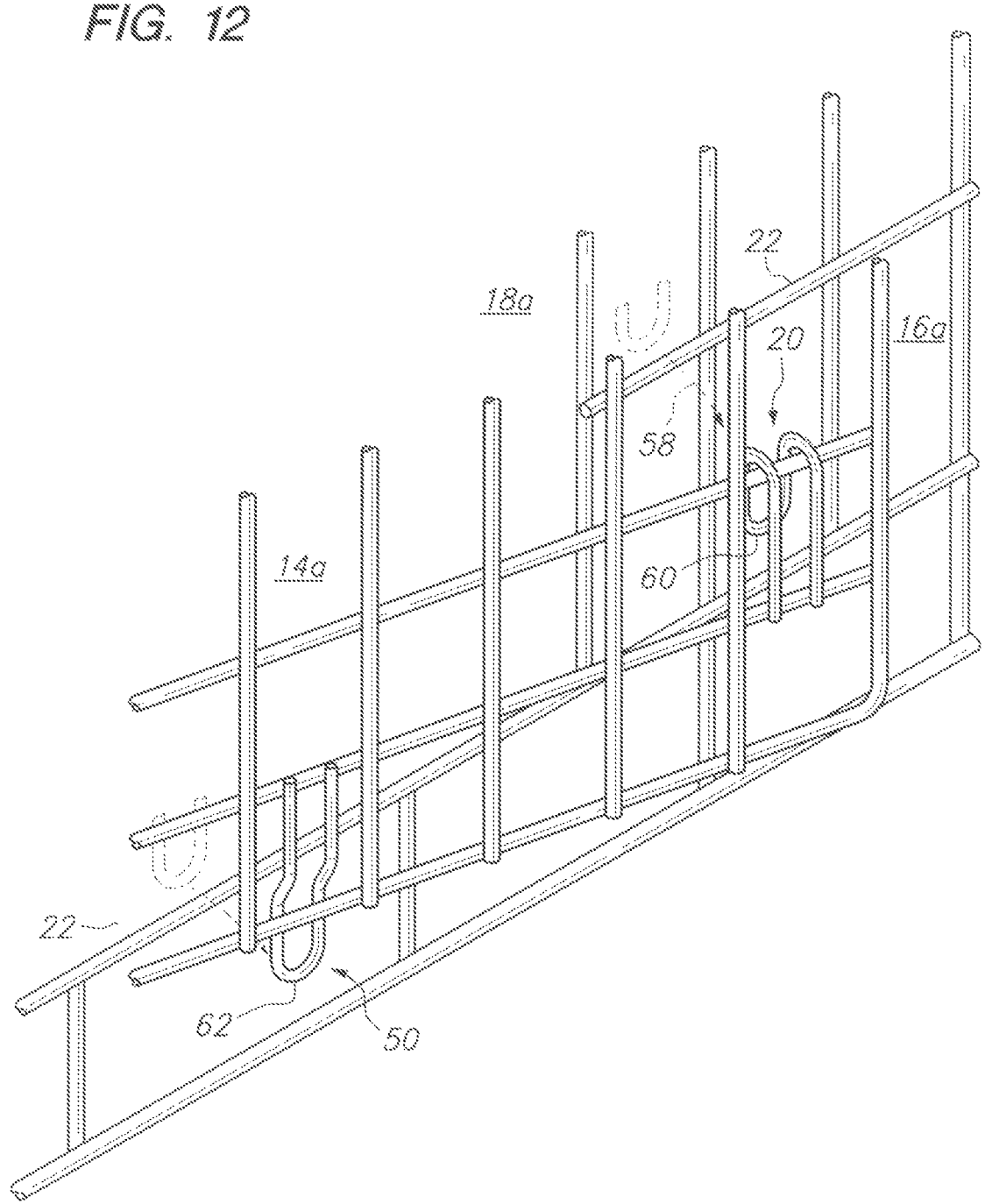
FIG. 12 is an illustration of the door and frame shown in FIG. 11 wherein the door is pivoted to an opened position.

Referring now to FIGS. 10-12, an inverted tab 50 is shown. The second embodiment of the inverted hooks 50 may be used in conjunction with the inverted hooks 20 on a side door 14a (see FIG. 1) of the pet crate 12. The inverted tab 50 has a protrusion 52 that is positioned behind a horizontal wire rod 22 of the frame 16a when the door 14a is in the closed position. Inverted tabs 50 can be placed strategically around the periphery of the door 14a so as to engage the frame 16a and reinforce and strengthen the door 14a. In the example shown in FIGS. 10-12, the inverted tab 50 is shown as being located on the bottom edge of the door 14a. However, inverted tabs 50 can be placed at other strategic locations on the periphery of the door 14a. By way of example and not limitation, inverted tabs 50 may be placed at the upper and lower corners, the right edge or portion of the door 14a or the upper edge or upper portion of the door 14a. However, for the purposes of clarity, only one inverted tab 50 is being shown. The inverted tabs 50 point downward so that an animal or the operator cannot step on the inverted tab 50 and injure themselves.

The inverted tab 50 may be secured or attached to one or more horizontal wire rods 26 of the side door. In the figures, the inverted tab 50 is shown as being secured or attached to two horizontal wire rods 26i, j of the side door 14a. In particular, the inverted tab 50 may be bent and shaped so as to be attached to the upper wire rod 26i and proceed behind the lower wire rod 26 and may protrude or extend beyond the lower wire rod 26j. The portion of the wire rod 26 that extends below the lower most wire rod 26j defines the tab portion 52 which is caught behind the horizontal wire rod 22 of the frame 16a. The interference between the tab portion 52 and the horizontal wire rod 22 prevents the door from being pushed open when in the closed position. In the example shown in FIG. 10, the inverted tab 50 is comprised of a wire rod shaped into a U-shaped configuration. However, it is also contemplated that the wire rod of the inverted tab 50a may be attached to upper and lower wire rods 26i, j of the door 14a and configured as an I-shaped configuration with a loop 54 at the bottom to prevent the inverted tab 50a from piercing the animal or user during use of the device. This configuration is shown in FIG. 10 in phantom.

As can be seen in FIG. 10, the inverted tab 50, 50a can be combined with inverted hooks 20. The inverted hooks 20 and inverted tabs 50, 50a can be strategically placed around the periphery of the door 14a to strengthen and reinforce the door 14a. In FIG. 10, the inverted tab 50 is shown as being located on a bottom edge of the door 14a.

From the closed position shown in FIG. 10, the door 14a may be traversed to the open position by raising the door 14a as shown in direction 56 in FIG. 11. The inverted hooks 20 and inverted tabs 50 clear horizontal wire rods 22 of the frame 16a. The door 14a can now be pivoted to the opened position as shown by arrow 58 in FIG. 12 so that the aperture 18a of the frame 16a is unblocked to allow the animal or pet to enter or exit through the aperture 18a of the frame 16a. When the door 14a is pivoted in the direction of arrow 58, the lowest most tips 60, 62 of the inverted hooks 20, 50 clear the horizontal wire rods 22 of the frame 16a. To close the door 14a, the door 14a is raised so that the inverted hooks 20 and inverted tabs 50 clear the horizontal wire rods 22 of the frame 16a. At this point, the door 14a can be pivoted so as to be in contact with the frame 16a. The inverted hooks 20 and inverted tabs 50 are aligned to the horizontal wire rods 22 of the frame 16a. When the door 14a is lowered, the horizontal wire rods 22 are received into the inverted hooks 20 and the inverted tab 50 is disposed behind the horizontal wire rod 22 of the frame 16a. The door 14a is now closed. The animal cannot push the door 14a open.

Figure 13:
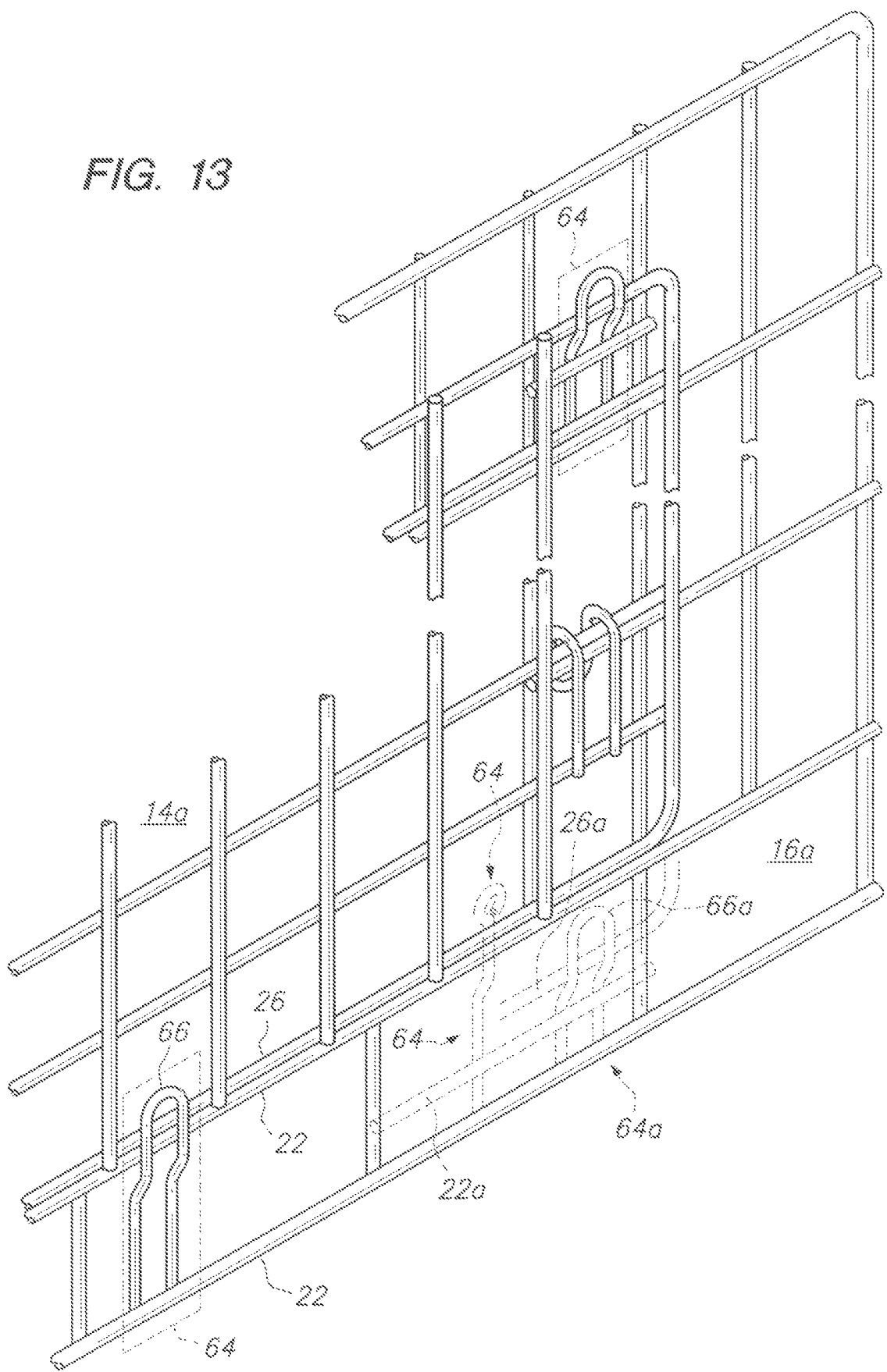
FIG. 13 is an illustration of an upright tab.

Referring now to FIG. 13, an upright tab 64 is shown. The upright tab 64 is shown as being located on the top and bottom edges of the frame 16a. Additional upright tabs 64 may be strategically placed at other locations around the periphery of the door 14a to strengthen and reinforce the door 14a to the frame 16a. The upright tab 64 may be attached to one or more adjacent horizontal wire rods of the frame 16a. In FIG. 13, the upright tab 64 is shown as being attached to two adjacent horizontal wire rods of the frame 16a. The upright tab 64 extends beyond the upper horizontal wire rod 22 so that a protrusion 66 is disposed in front of the horizontal wire rod 26 of the door 14a. More particularly, the protrusion 66 is disposed in front of a horizontal wire rod 26 of the door 14a. When the animal or pet attempts to push the door 14a open from the inside, the door 14a pushes against the tab portion 66 of the upright hooks 64 and cannot be opened. The upright tab 64 has a single wire rod 22 that is attached to a horizontal wire rod 22, extends upward and downward to form protrusion 66 and has a U-shaped configuration which terminates at the lower wire rod 22. Other configurations are also contemplated, such as an I-shaped configuration shown in dash lines in FIG. 13. In this alternative configuration, the wire rod 22 extends from the lower wire rod 22 and extends above the upper wire rod 22 and terminates in a round loop to prevent the upright tab 64 from piercing or cutting the user or pet during use of the device.

The upright tabs 64 on the top edge of the frame 16a may be disposed outside of the inner periphery of the aperture of the frame 16a through which the animal enters and exits. The upright tabs 64 on the bottom edge of the frame 16a may extend inside of the inner periphery of the aperture of the frame, as shown in FIG. 13. However, this is not preferred. Rather, the protrusion 66 of the upright tab 64 can be shortened as shown in dash lines on the right of FIG. 13 so that the protrusion 66 is outside or under the inner periphery of the aperture of the frame 16a. The upright tab 64a may be attached to only one of the horizontal wire rod of the frame 22. Alternatively, to strengthen the upright tab 64, a short horizontal wire rod 22a may be welded or attached to two adjacent vertical wire rods of the frame 16a and the upright tab 64a. The bottom of the door 14a would also overlap the frame 16a as shown in FIG. 13 so that the bottom horizontal wire rod 26a of the door 14a is received behind the protrusion 66a of the upright tab 64a.

The inverted hooks 20, upright hooks 48, inverted tabs 50 and upright tabs 64 may be utilized alone or in combination with each other and strategically placed about the door 14 or door 14a and/or frame 16 or frame 16a to strengthen the door.

The above description is given by way of example, and not limitation. Given the above disclosure, one skilled in the art could devise variations that are within the scope and spirit of the invention disclosed herein, including various ways of forming the pivot axis of the door 14. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An animal door system for an animal enclosure, the system comprising:
   a door having a plurality of interconnected vertical and horizontal wire rods that define an outer periphery of the door;
   a frame including an opening having an inner periphery and including a plurality of wire panels, each of the wire panels having a plurality of interconnected vertical and horizontal wire rods, the door being sufficiently large to cover the opening, the outer periphery of the door overlapping the inner periphery of the opening in a closed position of the door; and
   a hook fixedly attached to the frame such that the hook is disposed outside the inner periphery of the opening and at least partially within the outer periphery of the door when the door is in the closed position, the hook including an entry facing in an upward direction,
   the plurality of horizontal wire rods of the door being wrapped around a vertical wire rod of the frame for laterally pivoting the door in a horizontal direction to open and close the door and enabling the door to slide in the upward direction to an upward position and in a downward direction to a downward position such that the entry of the hook is capable of receiving a horizontal wire rod of the door when the door is in the closed position and in the downward position to strengthen the animal door system and the hook is fabricated from a wire rod that is curved to form a blunt tip of the hook.

2. The door system of claim 1 wherein
   a width of the entry of the hook attached to the frame is greater than a diameter of the horizontal wire rod of the door.

3. The system of claim 1 wherein
   the opening is positioned at a central area of the wire panel having the opening.

4. The system of claim 1 wherein
   the hook is one of a plurality of hooks disposed on the frame at least partially within the outer periphery of the door when the door is in the closed position.

5. The system of claim 4 wherein
   the plurality of hooks is disposed on an upper side of the opening.

6. The system of claim 4 wherein
   the plurality of hooks is disposed on an upper side and a lower side of the opening.

7. The system of claim 4 wherein
   the plurality of hooks is disposed on a lateral side of the opening opposite first vertical wire rod of the frame.

8. The system of claim 1 wherein a width of an opening of the hook is greater than a diameter of the horizontal wire rod of the frame.

* * * * *